US010856047B2

(12) United States Patent
Fang et al.

(10) Patent No.: US 10,856,047 B2
(45) Date of Patent: *Dec. 1, 2020

(54) SET-TOP BOX, SYSTEM AND METHOD FOR PROVIDING AWARENESS IN A HOSPITALITY ENVIRONMENT

(71) Applicant: Enseo, Inc., Richardson, TX (US)

(72) Inventors: William C. Fang, Plano, TX (US); Thomas R. Miller, Plano, TX (US); Vanessa Ogle, Fairview, TX (US)

(73) Assignee: Enseo, Inc., Plano, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 15/801,493

(22) Filed: Nov. 2, 2017

(65) Prior Publication Data
US 2018/0077459 A1    Mar. 15, 2018

Related U.S. Application Data

(63) Continuation-in-part of application No. 15/145,448, filed on May 3, 2016, now Pat. No. 9,654,826, which
(Continued)

(51) Int. Cl.
*H04N 21/214*  (2011.01)
*H04N 21/45*   (2011.01)
*H04N 21/422*  (2011.01)
*H04N 21/414*  (2011.01)
*H04N 21/41*   (2011.01)
(Continued)

(52) U.S. Cl.
CPC ......... *H04N 21/4516* (2013.01); *G07C 1/00* (2013.01); *H04N 21/2143* (2013.01); *H04N 21/23605* (2013.01); *H04N 21/25841* (2013.01); *H04N 21/414* (2013.01); *H04N 21/4108* (2013.01); *H04N 21/42221* (2013.01); *H04N 21/4343* (2013.01); *H04N 21/43615* (2013.01); *H04N 21/43637* (2013.01); *H04N 21/44227* (2013.01); *H04N 21/4524* (2013.01); *H04W 84/12* (2013.01)

(58) Field of Classification Search
CPC .................................................. H04N 21/2143
See application file for complete search history.

(56) References Cited

U.S. PATENT DOCUMENTS 5,929,777 A *  7/1999  Reynolds ............. G08B 25/016
                                              250/339.14
9,332,304 B2   5/2016  Ogle et al.
(Continued)

*Primary Examiner* — Michael H Hong
(74) *Attorney, Agent, or Firm* — Scott Griggs; Griggs Bergen LLP

(57) ABSTRACT

A system and method for providing awareness in a hospitality environment are presented. In one embodiment, a vertical and horizontal array of set-top boxes is provided and each set-top box includes an identification corresponding to the room in which the set-top box is placed. Each set-top box includes an infrared receiver that receives an infrared signal from a proximate wireless-enabled programmable device and responsive thereto, transmits a data packet including set-top box identification and a proximate wireless-enabled programmable device identification. A server determines the location of the proximate wireless-enabled programmable device based on the data packet.

21 Claims, 5 Drawing Sheets

Related U.S. Application Data is a continuation of application No. 14/461,484, filed on Aug. 18, 2014, now Pat. No. 9,332,304.

(60) Provisional application No. 62/416,761, filed on Nov. 3, 2016, provisional application No. 61/935,862, filed on Feb. 5, 2014.

(51) Int. Cl.
| | |
|---|---|
| *H04N 21/236* | (2011.01) |
| *G07C 1/00* | (2006.01) |
| *H04N 21/258* | (2011.01) |
| *H04N 21/4363* | (2011.01) |
| *H04N 21/434* | (2011.01) |
| *H04N 21/442* | (2011.01) |
| *H04N 21/436* | (2011.01) |
| *H04W 84/12* | (2009.01) |

(56) References Cited

U.S. PATENT DOCUMENTS

| | | |
|---|---|---|
| 9,344,757 B2 | 5/2016 | Ogle et al. |
| 9,357,254 B2 | 5/2016 | Ogle et al. |
| 9,654,826 B2 | 5/2017 | Ogle et al. |
| 2002/0186135 A1* | 12/2002 | Wagner .............. G08B 21/0202 340/573.1 |
| 2011/0099575 A1* | 4/2011 | Woo ........................ H04H 20/59 725/33 |
| 2013/0129358 A1* | 5/2013 | Jung .................. H04B 10/1141 398/112 |

* cited by examiner

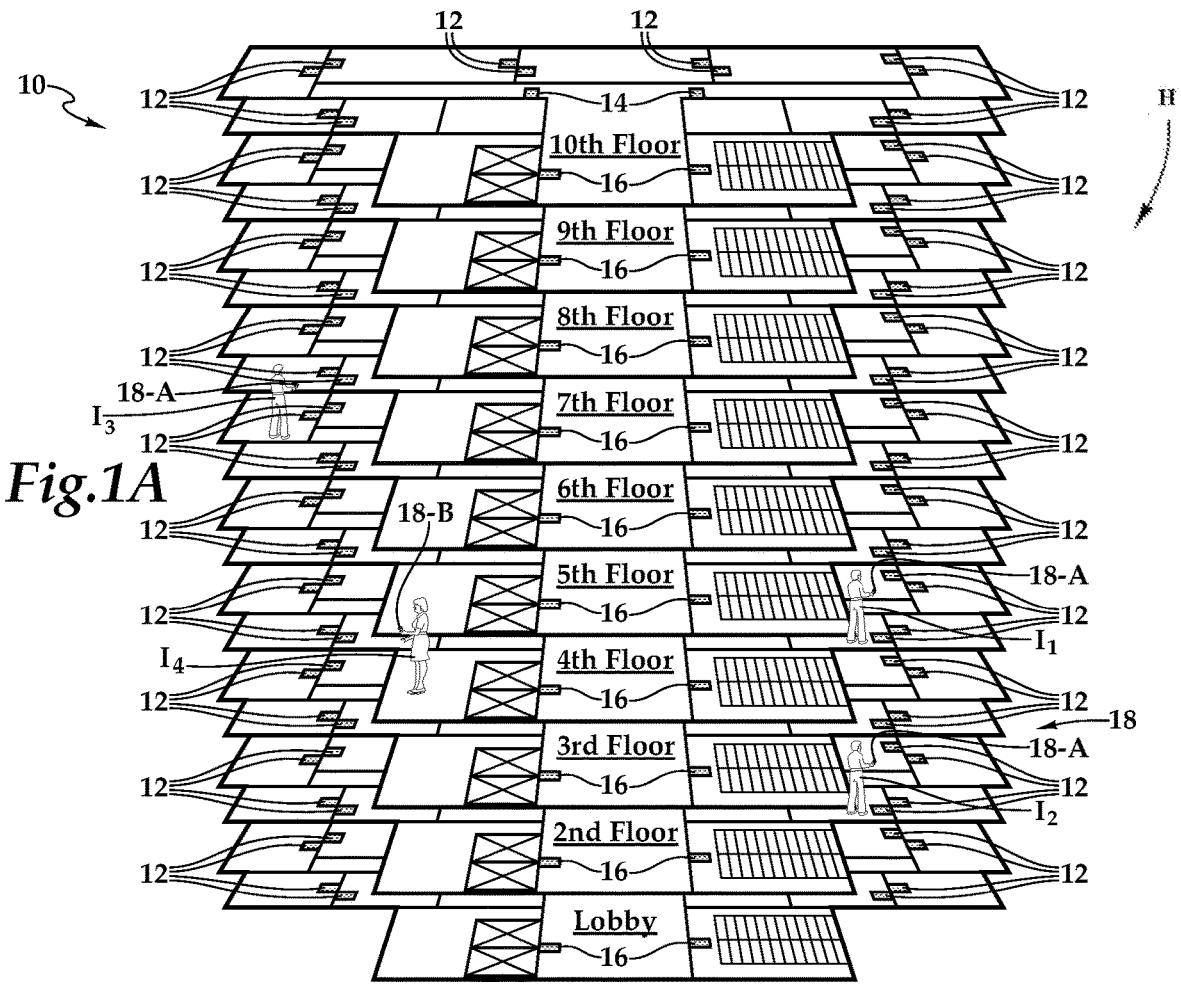

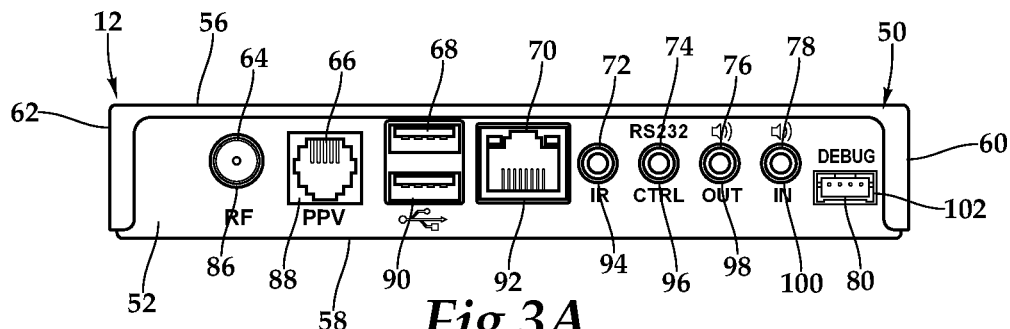
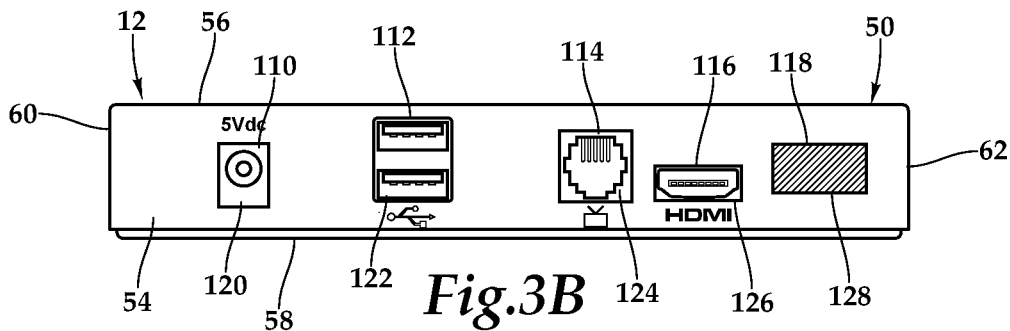
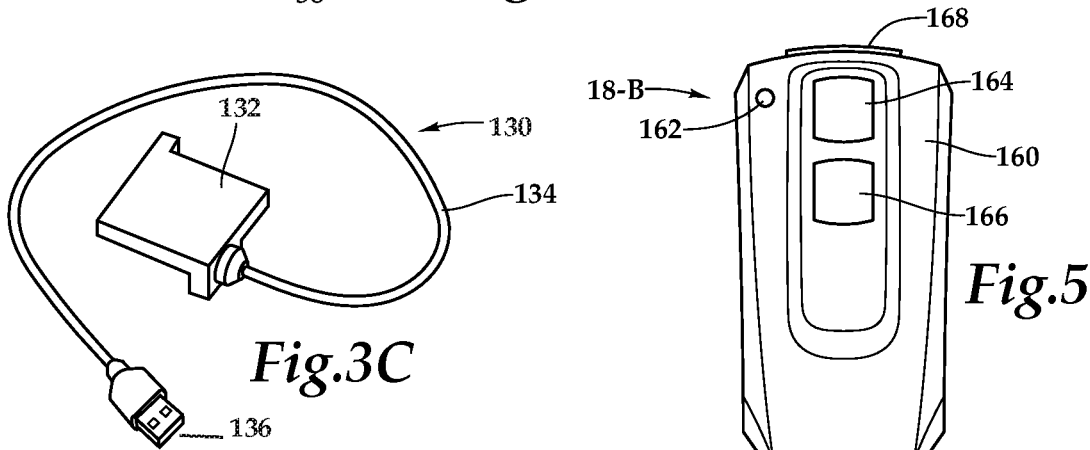
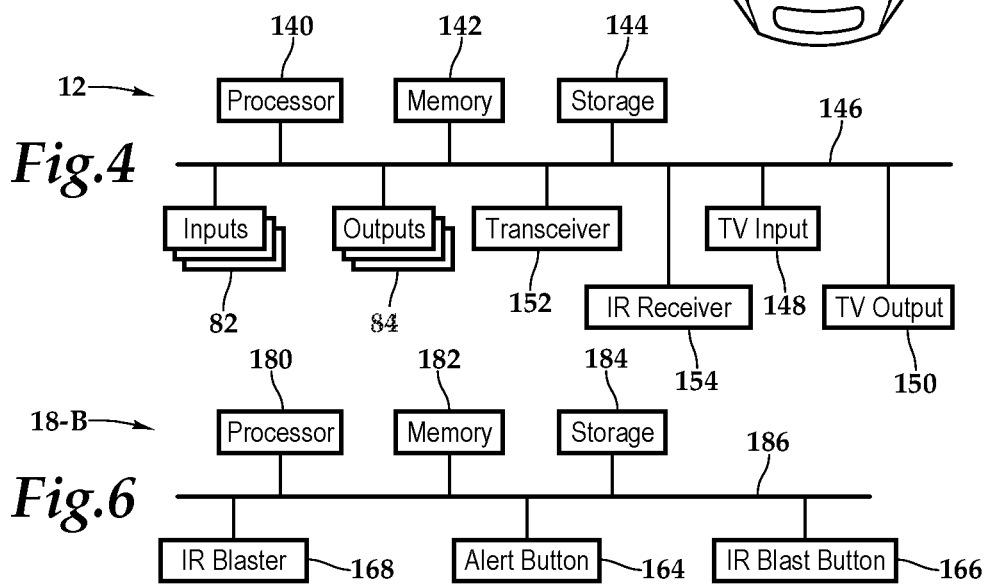

SET-TOP BOX, SYSTEM AND METHOD FOR PROVIDING AWARENESS IN A HOSPITALITY ENVIRONMENT

PRIORITY STATEMENT & CROSS-REFERENCE TO RELATED APPLICATIONS

This application claims priority from U.S. Application Ser. No. 62/416,761, entitled "Set-Top Box, System and Method for Providing Awareness in a Hospitality Environment" and filed on Nov. 3, 2016, in the names of Vanessa Ogle et al. This application is also a continuation-in-part of U.S. patent application Ser. No. 15/145,448 entitled "Set-top Box, System and Method for Providing Awareness in a Hospitality Environment," and filed on May 3, 2016 in the names of Vanessa Ogle et al; which is a continuation of U.S. patent application Ser. No. 14/461,484 entitled "Set-top Box, System and Method for Providing Awareness in a Hospitality Environment," and filed on Aug. 18, 2014 in the names of Vanessa Ogle et al., now issued as U.S. Pat. No. 9,332,304 on May 3, 2016; which claims priority from U.S. Patent Application Ser. No. 61/935,862 entitled "System and Method for Providing Awareness in a Hospitality Environment" and filed on Feb. 5, 2014 in the name of Vanessa Ogle; all of which are hereby incorporated by reference for all purposes.

TECHNICAL FIELD OF THE INVENTION

This invention relates, in general, to remote control devices and, in particular, to set-top/back boxes as well as systems and methods for providing awareness in a hospitality environment, such as a lodging establishment, motel, or hotel, for example.

BACKGROUND OF THE INVENTION

Without limiting the scope of the present invention, the background will be described in relation to employee safety in hospitality environments, as an example. Employees face increased personal security risks at work in hospitality environments, such as lodging establishments, motels, and hotels, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve awareness in hospitality environments that would decrease personal security risks to workers. It would also be desirable to enable a wireless-based solution that would mitigate or eliminate the cost of providing increased security in lodging establishments, such as a motel, or hotel, for example. More generally, it would be desirable to enable such a solution for any multi-unit environment including hospitality environments, educational campuses, hospital campuses, office buildings, multi-unit dwellings, sport facilities and shopping malls, whether a single story, multiple stories, or a combination thereof. To better address one or more of these concerns, systems and methods, including a set-top box, are disclosed for providing awareness in hospitality environments. In one embodiment of the system, a vertical and horizontal array of set-top boxes is provided and each set-top box includes an identification corresponding to the room in which the set-top box is placed. The location of an individual may be determined via a proximate wireless-enabled programmable device using either an IR mode of operation or a beacon mode of operation. It should be appreciated that the various proximate wireless-enabled programmable devices and the corresponding array of set-top boxes may operate in one of these modes of operation or both.

With respect to the IR mode of operation, each set-top box includes an infrared receiver that receives an infrared signal from a proximate wireless-enabled programmable device and responsive thereto, transmits a data packet including set-to box identification and a proximate wireless-enabled programmable device identification. A server determines the location of the proximate wireless-enabled programmable device based on the data packet. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A is a schematic building diagram depicting one embodiment of a system for providing awareness in a hospitality environment illustrated as a hotel, according to the teachings presented herein;

FIG. 1B is a schematic floor plan depicting a floor of the hotel presented in FIG. 1A in further detail;

FIG. 3A is a wall-facing exterior elevation view of one embodiment of the set-top box depicted in FIG. 1 in further detail;

FIG. 3B is a television-facing exterior elevation view of the set-top box depicted in FIG. 2A;

FIG. 3C is a front perspective view of a dongle, which may be coupled to the set-top box depicted in FIG. 1;

FIG. 4 is a functional block diagram depicting one embodiment of the set-top box presented in FIGS. 3A and 3B;

FIG. 5 is a front elevation view of one embodiment of a wireless-enabled programmable device presented in FIG. 2;

FIG. 6 is a functional block diagram depicting one embodiment of wireless-enabled programmable device presented in FIG. 5;

DETAILED DESCRIPTION OF THE INVENTION

Figure 1C:
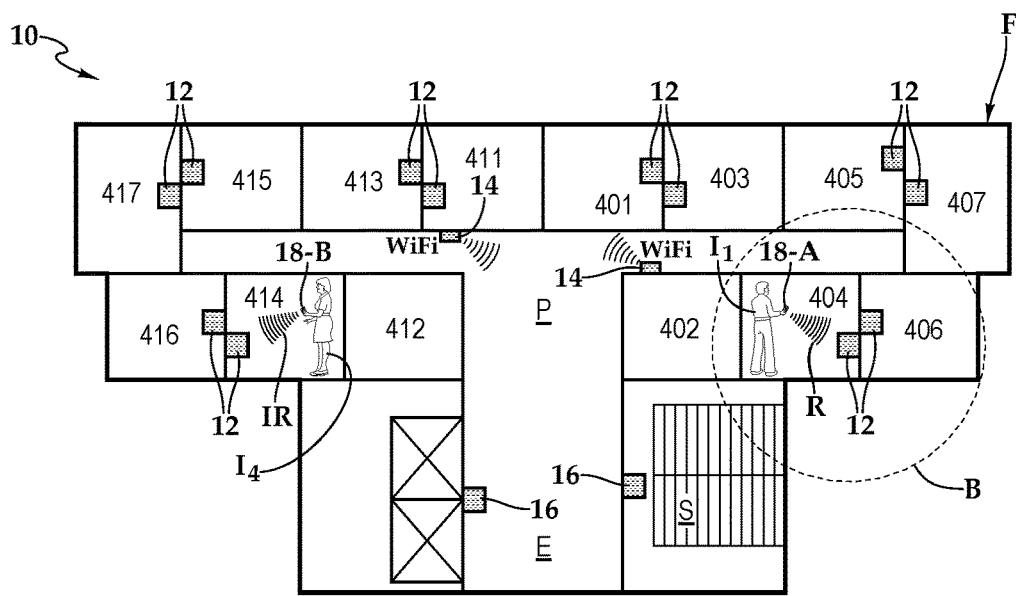
FIG. 1C is a schematic floor plan depicting a floor of the hotel presented in FIG. 1A in further detail, wherein an event requiring an alert is occurring.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIGS. 1A and 1B, therein is depicted a system for providing awareness in a hospitality environment, such as a furnished multi-family residence, dormitory, lodging establishment, hotel, hospital, or other multi-unit environment which is schematically illustrated and designated 10. More generally, the system 10 and the teachings presented herein are applicable to any multi-unit environment including hospitality environments, educational campuses, hospital campuses, office buildings, multi-unit dwellings, sport facilities and shopping malls.

As shown, by way of example and not by way of limitation, the hospitality environment is depicted as a hotel having a lobby and floors F, which are appropriately labeled the $2^{nd}$ floor through the $10^{th}$ floor. Further, by way of example, the $4^{th}$ floor is depicted with rooms 401, 402, 403, 404, 405, 406, 407, 411, 412, 413, 414, 415, 416, and 417. Additionally, a common area near the elevators is labeled E, a hallway labeled P, and a stairwell is labeled S.

Set-top boxes are communicatively disposed with various amenities associated with the hospitality environment, which as mentioned is depicted as the hotel H. As used herein, set-top boxes include back boxes and set-top/back boxes and may be discussed as set-top boxes. By way of example, each set-top box 12 may be a set-top unit that is an information appliance device that generally contains a TV-tuner input connected to an external source of content and a television output connected to a television set. The set-top box tunes the source signal into content in a form that can then be displayed on the television screen or other display device. Such set-top boxes are used in cable television, satellite television, and over-the-air television systems, as well as other uses, such as, an informational appliance coupled to various hospitality suites of service provided by the hotel H, including, for example, check in/check out, maid service, spa, room service, and front desk. As shown, each room includes a set-top box 12. The set-top boxes are deployed as part of a horizontal and vertical array, which is generally a spatial array, throughout the hotel H. It should be appreciated, however, that the set-top boxes and more generally deployment of the system 10 may include a horizontal array. Further, the deployment may be in a single story, multiple stories, or a combination thereof. The location of an individual may be determined via a proximate wireless-enabled programmable device using either an IR mode of operation or a beacon mode of operation. It should be appreciated that the various proximate wireless-enabled programmable devices and the corresponding array of set-top boxes may operate in one of these modes of operation or both.

In one embodiment, each of the set-top boxes 12 emits a beacon, which is illustrated as field B, for identifying itself to detecting programmable devices, as will be discussed hereinbelow. In the aforementioned common areas, including the elevators E, the hallway P, and stairwell S, beacon devices 16 are depicted that emit fields B for identifying themselves to the programmable devices also. Wireless routers 14 are deployed as part of a horizontal and vertical array, or more generally a spatial array, throughout the hotel H to send and receive information. As shown, the wireless routers 14 are WiFi enabled. It should be appreciated however that the wireless routers 14 may communicate via infrared (IR), 802.11, 3G, 4G, Edge, ZigBee, near field communications (NFC), or Bluetooth and Bluetooth low energy, for example.

The set-top boxes 12 and beacon devices 16, which are collectively beacons, periodically transmit beacons to the programmable devices, such as wireless-enabled programmable device 18, being utilized by individual $I_1$. The programmable device 18 may be a wireless-enabled smart and interactive handheld device that may be supplied or carried by the user or guest and may be selected from a range of existing devices, such as, for example iPads®, iPhones®, iPod Touch®, Android® devices, Blackberry® devices, and laptops, tablet or smart watch, or other piece of jewelry or accessory carried or worn, for example. In another implementation, the programmable device 18 may be a special purpose device, including a battery powered personal locator device with a single button or multiple buttons. As shown, individual $I_1$ works in the hospitality industry at hotel H and is presently working on the $4^{th}$ floor. As the individual $I_1$ is working in room 404, the programmable device 18 is receiving beacons from the set-top box 12 that is located within the room 404. Additionally, the programmable device 18 is receiving beacons from the set-top box 12 that is located within the room 404 and responding to the beacons with wireless signal R.

Continuing to refer to FIGS. 1A and 1B, in another embodiment, each of the set-top boxes 12 is configured to receive an infrared signal from a proximate wireless-enabled programmable device. By way of example, a housekeeper $I_4$ in room 414 is carrying a programmable device 18 that emits an infrared signal (IR) that is received by the set-top box 12 in room 414. The system utilizes the receipt of this infrared signal at the set-top box 12 in room 414 to identify the location of the programmable device 18 and the housekeeper carrying that device, as will be described in further detail hereinbelow. As shown, the proximate wireless-enabled programmable device may be a proximate wireless-enabled programmable handheld device, a proximate wireless-enabled programmable interactive device, a proximate wireless-enabled programmable interactive handheld device 18-A, a personal locator device 18-B, or the like.

Figure 2:
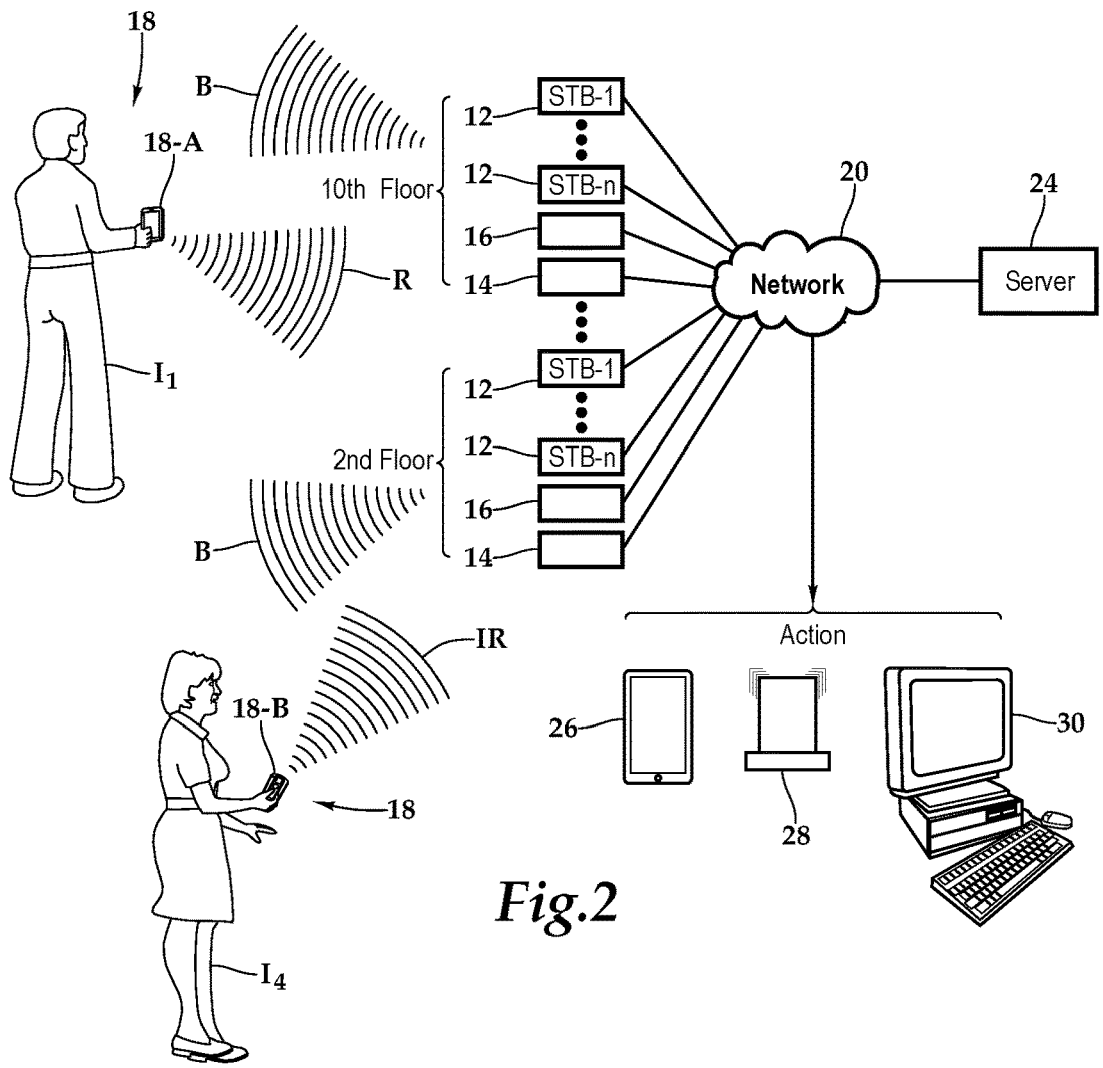
FIG. 2 is a schematic block diagram depicting one embodiment of the signal flow in the system presented in FIG. 1A.

Referring now to FIGS. 1C and 2, in one embodiment, the individual $I_1$ having the programmable device 18, which is receiving beacons from the set-top box 12 located within the room 404 and the set-top box 12 located within the room 404, perceives danger and requires assistance and help. The individual $I_1$ activates the programmable device 18, which sends a data packet that, via the wireless routers 14 and the network 20, communicates with a server 24. The server 24, in turn, sends out the appropriate notifications to various phones 26, to activate alarms 28, or notify others via a computer, such as computer 30. As a spatial array of horizontal and vertical set-top boxes 12 and beacon devices 16 are provided, the system presented herein is able to determine the location of the individual $I_1$ within a building. The location information determined includes which floor the individual $I_1$ is presently located as well as the room or common area.

In another mode of operation, the individual $I_2$ is located on the $3^{rd}$ floor of the hotel H. This individual is within the field of several beacons, including set-top boxes and common area beacon devices. The wireless-enabled interactive device associated with the individual I$_2$ periodically broadcasts a data packet to the server 24, via the wireless routers 14 and the network 20. The location of this individual is known and the individual I$_2$ publishes the location so that others may contact this individual or find this individual. Similarly, the location of the individual I$_3$ is known to be on the 6$^{th}$ floor of the hotel H. The individual users associated with a wireless-enabled interactive device are able to report service requests to the management of the hotel H.

Continuing to refer to FIGS. 1C and 2, in another embodiment, the individual I$_4$ having the programmable device 18-B, which is located in room 414 and the set-top box 12 located within the room 414, perceives danger and requires assistance and help. The individual I$_4$ activates the programmable device 18-B, which sends an infrared signal with a wireless-enabled programmable device identification, to the set-top box 12 in room 414 via infrared and the set-top box 12, in turn, communicates with a server 24. The server 24, in turn, sends out the appropriate notifications to various phones 26, to activate alarms 28, or notify others via a computer, such as computer 30. As a spatial array of horizontal and vertical set-top boxes 12 are provided, the system presented herein is able to determine the location of the individual I$_4$ within a building. The location information determined includes which floor the individual I$_1$ is presently located as well as the room or common area.

Referring now to FIGS. 3A, 3B, 3C, the set-top box 12 is illustrated in further detail. The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall 54 includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, an RJ45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, 116, and 118 include a 5V dc power connection 120, USB inputs/outputs 122, an RJ45 coupling 124, an HDMI port 126, and an infrared port 128. It should be appreciated that the configuration of ports may vary with the set-top box depending on application and context. As previously alluded to, the housing 50 may include a housing-dongle combination including, with respect to the dongle 130, a unit 132 having a cable 134 with a set-top box connector 136 for selectively coupling with the set-top box 12.

Within the housing 50, a processor 140, memory 142, storage 144, the inputs 82, and the outputs 84 are interconnected by a bus architecture 146 within a mounting architecture. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. The various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 50 in order to receive content from a source in the hospitality property and forward the content, including external content such as cable and satellite and pay-per-view (PPV) programming, to the television located within the hotel room.

A transceiver 152 is associated with the set-top box 12 and communicatively disposed with the bus 146. The transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, Wi-Fi, ZigBee, near field communications (NFC), Bluetooth low energy and Bluetooth, for example. Also, infrared (IR) may be utilized. An IR receiver 154 may form a portion of the transceiver 152 or be a separate component for receiving IR signals. The IR receiver 154 may be internal, external, or a combination thereof to the housing.

The memory 142 and storage 144 are accessible to the processor 140 and include processor-executable instructions that, when executed, cause the processor 140 to execute a series of operations. The processor-executable instructions cause the processor to, responsive to receiving the infrared signal from the proximate wireless-enabled handheld device, transmit a data packet. The data packet may include the receiving set-top box identification and a proximate wireless-enabled device identification.

Referring now to FIGS. 5 and 6, one embodiment of the programmable device is illustrated. A casing 160 houses an operational mode indicator 162, an alert button 164, and an IR blast button 166. An infrared blaster 168 extends from the casing 160. Within the casing 160, a processor 180, memory 182, storage 184, an IR blaster 168, an alert button 164, and an IR blast button 166 are interconnected by a bus architecture 186 within a mounting architecture. The processor 180 may process instructions for execution within the computing device, including instructions stored in the memory 182 or in storage 184. The memory 182 stores information within the computing device. In one implementation, the memory 182 is a volatile memory unit or units. In another implementation, the memory 182 is a non-volatile memory unit or units. Storage 184 provides capacity that is capable of providing mass storage for the programmable device 18. The alert button 164 initiates the transmission of a distress signal and the IR blast button 166 initiates the transmission of IR signals to inform the system of the location of the programmable device 18 and, by extension, the location of the user.

The memory 182 and storage 184 are accessible to the processor 180 and include processor-executable instructions that, when executed, cause the processor 180 to execute a series of operations. In one mode of operation, the processor-executable instructions cause the processor 180 to periodically transmit infrared signals from the IR blaster 168. In another mode of operation, the processor-executable instructions cause the processor to transmit one or more infrared signals from the IR blaster 168 in response to the actuation of the IR blast button 166. The processor-executable instructions may also cause the processor 180 to transmit a distress signal in response to the actuation of the alter button. Further, in another embodiment, the processor-executable instructions may cause the processor 180 to receive set-top box identification beacon signals and measure the strength of the identification beacon signals. The programmable device 18 then periodically transmits a broadcast signal including a data packet having at least one set-top box identification, a corresponding signal strength identification indicating the strength of the set-top box identification beacon signal, and a proximate wireless-enabled interactive device identification. Responsive to the activation of the emergency button, the programmable device 18 immediately transmits a broadcast signal including a data packet having at least one set-top box identification, a corresponding signal strength identification indicating the strength of the set-top box identification beacon signal, a proximate wireless-enabled interactive device identification, and an emergency alert.

The programmable device 18 may be a wireless communication device of the type including various fixed, mobile, and/or portable devices. To expand rather the limit the previous discussion of the programmable device 18, such devices may include, but are not limited to, cellular or mobile telephones, two-way radios, personal digital assistants, digital music players, Global Position System units, smart phones, smart watches, and so forth. It should be appreciated that although a particular architecture is explained, other designs and layouts are within the teachings presented herein.

In operation, the teachings presented herein permit a programmable device 18 such as a smart phone or simple transmitter to communicate with a set-top box that is able to relay an alert with location to a main server and security or other individuals needing to know about the emergency. In the operation embodiment being described, the programmable device 18 may be "paired" on a temporary basis to the set-top box 12 on a room-by-room basis, whereby the pairing changes as the hospitality employees location changes, thereby changing the strongest received signal.

In a further embodiment, as shown, the programmable device 18 includes the memory 182 accessible to the processor 180 and the memory 182 includes processor-executable instructions that, when executed, cause the processor to receive set-top box identification beacon signals and measure the strength of the identification beacon signals. The programmable device 18 then periodically transmits a broadcast signal including a data packet having at least one set-top box identification, a corresponding signal strength identification indicating the strength of the set-top box identification beacon signal, and a proximate wireless-enabled interactive device identification.

The aforementioned beacon 16 may have a similar construction with a housing protecting a transmitter/receiver, outputs, inputs, processor, bus, memory and storage. The memory is accessible to the processor, and the memory includes processor-executable instructions that, when executed, cause the processor to periodically transmit, via the transmitter/receiver, an identification beacon signal including beacon device identification.

Figure 7:
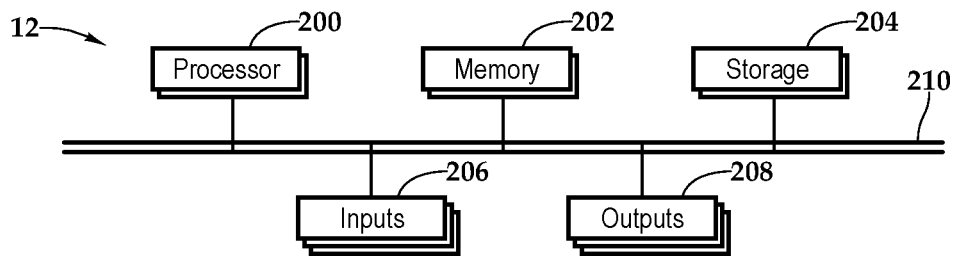
FIG. 7 is a schematic block diagram depicting one embodiment of a server, a component of the system presented in FIG. 2.

Referring to FIG. 7, one embodiment of the server 24 as a computing device includes a processor 200, memory 202, storage 204, inputs 206, and outputs 208 interconnected with various buses 210 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 200 may process instructions for execution within the server 24, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 includes capacity that is capable of providing mass storage for the server 24. Various inputs 206 and outputs 208 provide connections to and from the server 24, wherein the inputs 206 are the signals or data received by the server 24, and the outputs 208 are the signals or data sent from the server 24.

The memory 202 is accessible to the processor 200 and unit 132 and includes processor-executable instructions that, when executed, cause the processor 200 to execute a series of operations. The processor-executable instructions receive the data packet from the proximate wireless-enabled interactive device and process the data packet to determine the set-top box/beacon device or, more generally, beacon identification of strongest signal strength and the proximate wireless-enabled interactive device identification. Based on this analysis, the instructions determine the location of the proximate wireless-enabled interactive device as being proximate to the set-to box or beacon device of strongest signal strength. Depending on the configuration of the wireless-enabled interactive device, the processor-executable instructions update a database with the location and timestamp of the proximate wireless-enabled interactive device. Further, the processor-executable instructions may transmit a service request relative to the wireless-enabled interactive device, publish the location of the wireless-enabled interactive device, or execute an emergency alert or alarm.

In another embodiment, the processor-executable instructions cause the processor upon receipt of the data packet from the set-top box to process the data packet to determine the set-top box identification. The processor-executable instructions then cause the processor to determine the location of the proximate wireless-enabled programmable device as being proximate to the set-top box.

Figure 8A:
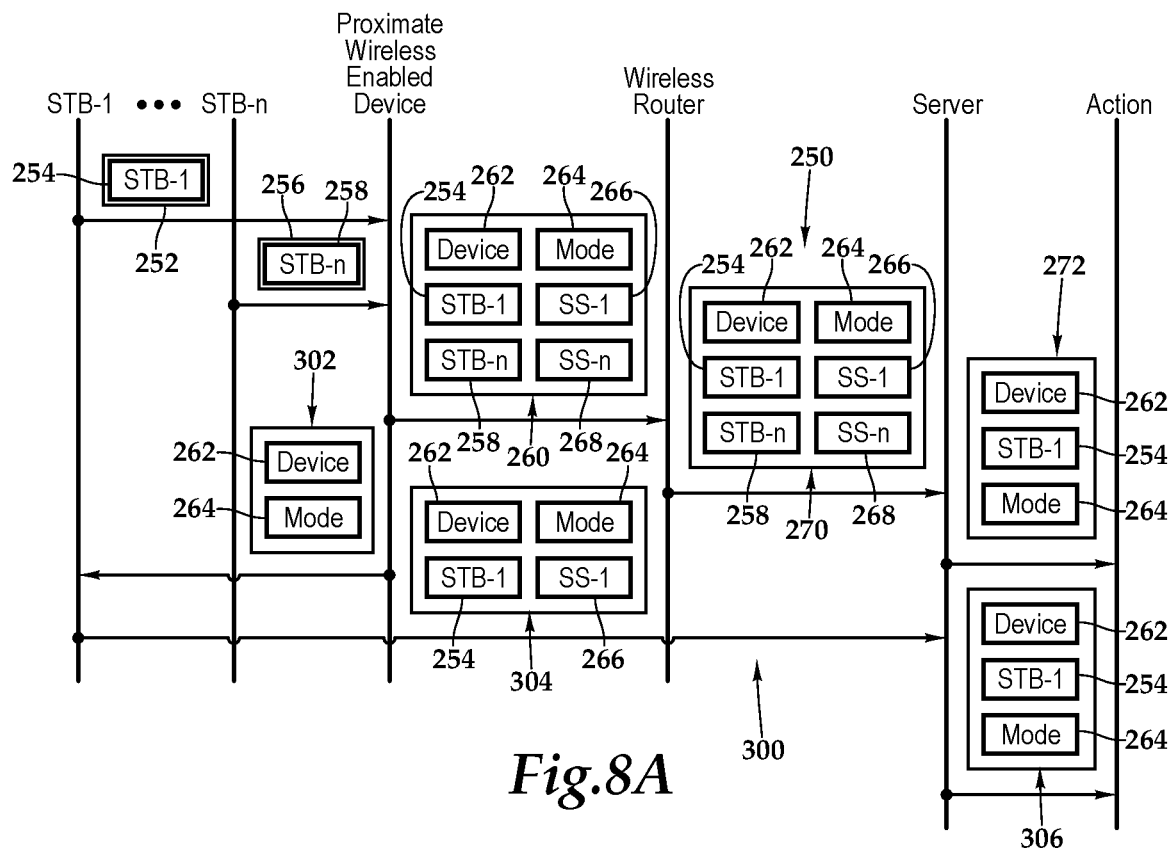
FIG. 8A is a signal flow diagram depicting one embodiment of signalization and data transfer within the system presented in FIG. 1A.

FIG. 8A illustrates one embodiment of signalization and data transfer 250. As shown, set-top boxes 1 through n respectively transfer data packet 252 including beacon identification, which is identification 254, and data packet 256 including beacon identification 258. The data packets 252, 256 are received by an interactive handheld device, which determines the signal strength of each received data packet 252, 256. The interactive handheld device then establishes data packet 260, including device indicator 262, mode of operation indicator 264, beacon identifications 254, 258, and respective signal strength identification 266, 268.

Once the data packet 260 is broadcast, it is received by a wireless router which relays the data packet 260 as data packet 270 that is received by a server. The server analyzes the data packet and determines that the interactive handheld device is proximate to the set-top box 1 as the signal strength associated with received data packet of set-top box 1 is strongest. The server then sends out signal 272, which includes the device identification 262, the location as represented by a set-top box and the mode of operation for appropriate action.

Another embodiment of signalization and data transfer 300 is depicted in FIG. 8A as well. A data packet 306, including device indicator 262 and mode of operation indicator 264 is transmitted from the interactive handheld device to the set-top box 1. In the illustrated embodiment, this may be an IR signal transmission or, more particularly, an IR blaster signal transmission. The set-top box 1, in turn, transmits a data packet 304, which includes the device indictor 262, the mode of operation indicator 264, a set-top box identifier, which is identification 254, and a signal strength identifier 266. This transmission is received by the server, which processes the data packet 304 to determine the location of the user of the interactive handheld device and takes appropriate action as illustrated by a data packet 306 including the device identifier 262, the set-top box identification 254, and the mode of operation identifier 264. As previously discussed, the location of an individual may be determined via a proximate wireless-enabled programmable device using either an IR mode of operation (see signalization and data transfer 300) or a beacon mode of operation (see signalization and data transfer 250). It should be appreciated that the various proximate wireless-enabled programmable devices and the corresponding array of set-top boxes may operate in one of these modes of operation or both.

Figure 8B:
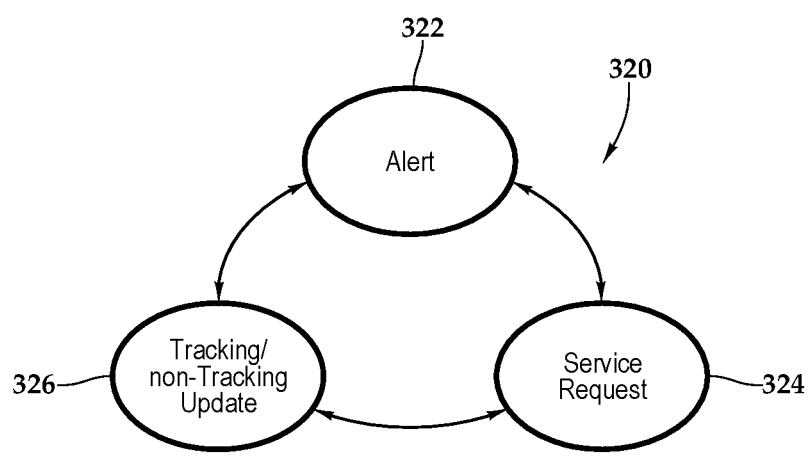
FIG. 8B is state diagram depicting one embodiment of the states of the system presented in FIG. 1A.

FIG. 8B depicts one embodiment of a state diagram 320 of the states of the system 10, which include an alert mode of operation 322, a service request mode of operation 324, and a tracking/non-tracking update mode of operation 326. As will be appreciated, the modes of operation may overlap or, to a partial or full extent be combined. In the alert mode of operation 322, a user of a wireless-enabled interactive device may send an alert to indicate distress. In the service request mode of operation 324, the user may send a service along with the location information. The tracking/non-tracking update mode 326 indicates the level of privacy the user expects and how much of the location history will be saved.

Figure 9:
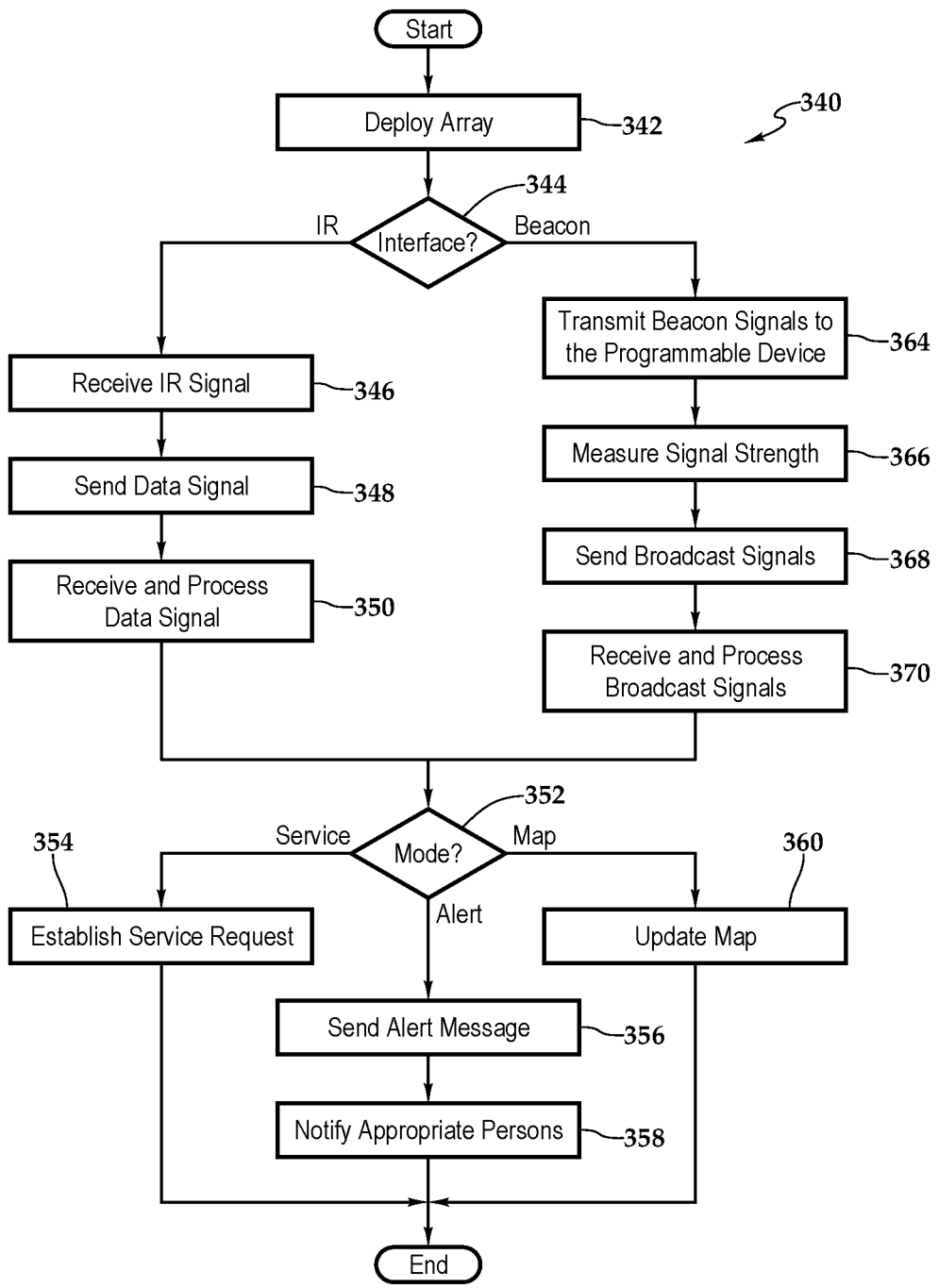
FIG. 9 is a flow chart depicting one embodiment of a method for providing awareness in a hospitality environment according to the teachings presented herein.

FIG. 9 depicts one embodiment of a method 340 for providing awareness in a hospitality environment, according to the teachings presented herein. At block 342, the array of set-top boxes and common area beacons is deployed vertically and horizontally throughout the hospitality environment. At decision block 344, if the mode being utilized is infrared (IR) then the methodology advances to block 346 wherein an IR signal is received by a set-top box and the then a data signal is sent at block 348 to the server. At block 350 the data signal is received and processed at the server.

At decision block 352, the server takes action based on the mode of operation. In a first mode of operation at block 354, a service request is associated with the location of the user utilizing the location of the wireless-enabled interactive programmable device as a proxy. In a second mode of operation at block 356, an emergency alert is sent and subsequent notification (block 356) occurs. The emergency alert includes an indication of distress and the location of the user utilizing the location of the wireless-enabled interactive programmable device as a proxy. In a third mode of operation at block 360, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

Returning to decision block 344 and the use of the beacon mode of interface, at block 364, beacon signals are periodically transmitted from the set-top boxes and common area beacons to be received by the wireless-enabled interactive devices. At block 366, the signal strength between the beacon transmission of the set-top boxes and the common area beacons at the wireless-enabled interactive programmable device is measured. At block 368, the wireless-enabled interactive programmable device broadcasts data packets, including the beacon identifications and associated signal strengths. At block 370, via the wireless routers, the server receives and processes the data packets.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a hospitality environment, the system comprising:
a vertical and horizontal array of set-top boxes, each set-top box being associated with a room in the hospitality environment, each set-top box having a set-top box identification including a room identifier;
each set-top box of the vertical and horizontal array including:
a housing,
a processor and memory within the housing,
an infrared receiver associated with the housing, the infrared receiver configured to receive an infrared signal from a proximate wireless-enabled programmable device,
a television input and a television output secured in the housing, the television input and the television output configured to respectively receive content from a source in the hospitality environment and forward content to a television,
a busing architecture communicatively interconnecting the processor, the memory, the television input, the television output, and the infrared receiver,
the memory accessible to the processor, the memory including processor-executable instructions that, when executed, cause the processor to:
responsive to receiving the infrared signal from the proximate wireless-enabled programmable device, transmit a data packet, the data packet including the receiving set-top box identification and a proximate wireless-enabled programmable device identification; and
a server located within the hospitality environment and in communication with the vertical and horizontal array of set-top boxes, the server including:
a processor, memory, inputs, and outputs,
a busing architecture communicatively interconnecting the processor, the memory, the inputs, and the outputs,
the inputs configured to receive the data packet from the set-top box, and
a memory accessible to the processor, the memory including processor-executable instructions that, when executed, cause the processor to:
upon receipt of the data packet from the set-top box, process the data packet to determine the set-top box identification, and determine the location of the proximate wireless-enabled programmable device as being proximate to the set-top box, the location of the proximate wireless-enabled programmable device being determined following communication from the proximate wireless-enabled interactive device to the vertical and horizontal array of set-top boxes to the server.

2. The system as recited in claim 1, wherein the infrared receiver is configured to receive communications from an infrared blaster.

3. The system as recited in claim 1, wherein the infrared receiver is located at least partially within the housing.

4. The system as recited in claim 1, wherein the infrared receiver is located at least partially exterior to the housing.

5. The system as recited in claim 1, wherein the proximate wireless-enabled programmable device further comprises a proximate wireless-enabled programmable handheld device.

6. The system as recited in claim 1, wherein the proximate wireless-enabled programmable device further comprises a proximate wireless-enabled programmable interactive device.

7. The system as recited in claim 1, wherein the proximate wireless-enabled programmable device further comprises a single button personal locator device.

8. The system as recited in claim 1, wherein the proximate wireless-enabled programmable device further comprises a single button personal locator device including an infrared blaster.

9. The system as recited claim 1, wherein the system further comprises an operational mode selected from the group consisting of alerts-enabled, service request-enabled, tracking-enabled, and non-tracking-enabled.

10. The system as recited in claim 1, wherein the server further comprises a back-office hotel server in communication with the vertical and horizontal array of set-top boxes.

11. The system as recited in claim 9, wherein in the alerts-enabled mode, the server receives from the vertical and horizontal array of set-top boxes a distress signal from the proximate wireless-enabled programmable device.

12. The system as recited in claim 9, wherein in the service-request-enabled mode, the server receives from the vertical and horizontal array of set-top boxes a service request from the proximate wireless-enabled programmable device.

13. The system as recited in claim 9, wherein in the tracking-enabled mode, the server maintains in memory a plurality of locations with timestamps associated with the data packet of the proximate wireless-enabled programmable device.

14. The system as recited in claim 9, wherein in the non-tracking-enabled mode, the server maintains in memory only the last known locations with timestamps associated with the data packet of the proximate wireless-enabled programmable device.

15. A system for providing awareness in a hospitality environment, the system comprising:
a horizontal array of set-top boxes, each set-top box being associated with a room in the hospitality environment, each set-top box having a set-top box identification including a room identifier;
each set-top box of the horizontal array including:
a housing,
a processor and memory within the housing,
an infrared receiver associated with the housing, the infrared receiver configured to receive an infrared signal from a proximate wireless-enabled handheld device,
a television input and a television output secured in the housing, the television input and the television output configured to respectively receive content from a source in the hospitality environment and forward content to a television,
a busing architecture communicatively interconnecting the processor, the memory, the television input, the television output, and the infrared receiver,
the memory accessible to the processor, the memory including processor-executable instructions that, when executed, cause the processor to:
responsive to receiving the infrared signal from the proximate wireless-enabled handheld device, transmit a data packet, the data packet including the receiving set-top box identification and a proximate wireless-enabled device identification; and
a server located within the hospitality environment and in communication with the vertical and horizontal array of set-top boxes, the server including:
a processor, memory, inputs, and outputs,
a busing architecture communicatively interconnecting the processor, the memory, the inputs, and the outputs,
the inputs configured to receive the data packet from the set-top box, and
a memory accessible to the processor, the memory including processor-executable instructions that, when executed, cause the processor to:
upon receipt of the data packet from the set-top box, process the data packet to determine the set-top box identification, and
determine the location of the proximate wireless-enabled device as being proximate to the set-top box, the location of the proximate wireless-enabled programmable device being determined following communication from the proximate wireless-enabled interactive device to the horizontal array of set-top boxes to the server.

16. The system as recited in claim 15, wherein the infrared receiver is configured to receive communications from an infrared blaster.

17. The system as recited in claim 15, wherein the infrared receiver is located at least partially within the housing.

18. The system as recited in claim 15, wherein the infrared receiver is located at least partially exterior to the housing.

19. The system as recited in claim 15, wherein the proximate wireless-enabled programmable device further comprises a proximate wireless-enabled programmable handheld device.

20. The system as recited in claim 15, wherein the proximate wireless-enabled programmable device further comprises a proximate wireless-enabled programmable interactive device.

21. A system for providing awareness in a hospitality environment, the system comprising:
a vertical and horizontal array of set-top boxes, each set-top box being associated with a room in the hospitality environment, each set-top box having a set-top box identification including a room identifier;
each set-top box of the vertical and horizontal array including:
a housing, a processor and memory within the housing, an infrared receiver associated with the housing, the infrared receiver configured to receive an infrared blaster signal from a proximate wireless-enabled handheld device, the proximate wireless-enabled programmable device including a single button personal locator device having an infrared blaster, a television input and a television output secured in the housing, the television input and the television output configured to respectively receive content from a source in the hospitality environment and forward content to a television, a busing architecture communicatively interconnecting the processor, the memory, the television input, the television output, and the infrared receiver, the memory accessible to the processor, the memory including processor-executable instructions that, when executed, cause the processor to:

responsive to receiving the infrared signal from the proximate wireless-enabled handheld device, transmit a data packet, the data packet including the receiving set-top box identification and a proximate wireless-enabled device identification; and a server located within the hospitality environment and in communication with the vertical and horizontal array of set-top boxes, the server including:

a processor, memory, inputs, and outputs, a busing architecture communicatively interconnecting the processor, the memory, the inputs, and the outputs, the inputs configured to receive the data packet from the set-top box, and a memory accessible to the processor, the memory including processor-executable instructions that, when executed, cause the processor to:

upon receipt of the data packet from the set-top box, process the data packet to determine the set-top box identification, and determine the location of the proximate wireless-enabled device as being proximate to the set-top box, the location of the proximate wireless-enabled programmable device being determined following communication from the proximate wireless-enabled interactive device to the vertical and horizontal array of set-top boxes to the server.

\* \* \* \* \*